US011936150B2

(12) United States Patent
Wimmer

(10) Patent No.: US 11,936,150 B2
(45) Date of Patent: Mar. 19, 2024

(54) ELECTRICAL CONNECTOR AND METHOD OF ASSEMBLING AN ELECTRICAL CONNECTOR ASSEMBLY

(71) Applicant: Rosenberger Hochfrequenztechnik GmbH & Co. KG, Fridolfing (DE)

(72) Inventor: Martin Wimmer, Palling (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 109 days.

(21) Appl. No.: 17/735,279

(22) Filed: May 3, 2022

(65) Prior Publication Data

US 2022/0376452 A1 Nov. 24, 2022

(30) Foreign Application Priority Data

May 19, 2021 (EP) .................................... 21174630

(51) Int. Cl.
*H01R 43/00* (2006.01)

(52) U.S. Cl.
CPC .................................. *H01R 43/002* (2013.01)

(58) Field of Classification Search
None
See application file for complete search history.

(56) References Cited

U.S. PATENT DOCUMENTS

| | | | | |
|---|---|---|---|---|
| 5,921,803 | A | 7/1999 | Mori | |
| 8,069,521 | B2 * | 12/2011 | Beck | B08B 9/023 15/104.04 |
| 9,172,156 | B2 | 10/2015 | Nugent et al. | |
| 9,692,196 | B2 * | 6/2017 | Fong | H01R 4/36 |
| 10,693,269 | B2 * | 6/2020 | Diop | H01R 43/002 |

FOREIGN PATENT DOCUMENTS

| | | | |
|---|---|---|---|
| DE | 102013007166 | A1 | 10/2014 |
| EP | 3761456 | A1 | 1/2021 |
| KR | 20120030069 | A * | 3/2012 |

* cited by examiner

*Primary Examiner* — Tho D Ta
(74) *Attorney, Agent, or Firm* — Dickinson Wright PLLC

(57) ABSTRACT

An electrical connector for an electrical cable having a contact element for connection to an electrical conductor of the electrical cable. The electrical connector has an integrated cleaning tool for the electrical conductor. The cleaning tool is arranged along a feed direction for the electrical cable on the cable side upstream of the contact element. It is provided that the cleaning tool is designed to remove or at least retain particles, residues of a sheathing and/or contaminants adhering to the electrical conductor before the electrical conductor contacts the contact element of the electrical connector arranged downstream in the feed direction within the scope of a connector assembly process.

13 Claims, 2 Drawing Sheets

ELECTRICAL CONNECTOR AND METHOD OF ASSEMBLING AN ELECTRICAL CONNECTOR ASSEMBLY

CROSS REFERENCE TO RELATED APPLICATION

This US Utility patent application claims the benefit of and priority to EP Patent Application No. 21174630 filed on May 19, 2021, the entire disclosure of which is incorporated herein by reference.

BACKGROUND OF THE INVENTION

1. Field of the Invention

The invention relates to an electrical connector for an electrical cable, according to the preamble of claim 1.

The invention additionally relates to an electrical connector assembly.

The invention further relates to a method for assembling an electrical connector assembly.

2. Related Art

For the transmission of high-frequency signals over long cable runs, for example on antenna masts for mobile radio stations or for other transmitting and receiving equipment, low transmission loss, high shielding efficacy and high load capacity are required. The requirement for low transmission loss and high loading can be met with a large cable diameter, in particular in the cm range, and with the use of foamed polyethylene for the dielectric. Very good shielding efficacy is achieved with a closed metal tube as the outer conductor. To allow such a cable to be additionally bent during installation, the outer conductor and possibly also the inner conductor are each designed as a corrugated metal tube. Such a cable is thus often referred to as a "corrugated sheath cable".

A corrugated sheath cable is typically connected on site to a suitable coaxial connector. Such a coaxial connector for a corrugated sheath cable is therefore also referred to as a "field-installable connector". For example, U.S. Pat. No. 9,172,156 B2 discloses an electrical connector assembly formed of such a field-installable coaxial connector and a coaxial corrugated sheath cable.

Before the cable is assembled in the connector, it usually has to be preassembled, which is sometimes also done on site and manually by a fitter. Among other things, the electrical conductors of the cable are exposed or made accessible for contacting with the contact elements of the connector. The cable can then be pressed and/or screwed into the connector, for example.

As a rule, however, residues of the original sheathing or dielectric remain on the exposed ("stripped") conductors, in particular on an inner conductor of the cable. In addition, other particles and contaminants may also attach to the exposed conductors, in particular since technical cleanliness in a field installation can never reach industrial or even laboratory standards. The remnants of the sheathing, particles and other contaminants can subsequently degrade the electrical contact between the electrical conductor of the cable and the contact elements of the connector.

For this reason, the exposed conductors are usually cleaned on site immediately before insertion into the connector. Special cleaning tools are used for this purpose. A particular difficulty in cleaning the electrical conductors is ensuring that the electrical conductor is not damaged, for example scratched, by the cleaning measures, despite the sometimes difficult working conditions (for example, at a dizzy height on a mobile phone mast).

This additional work step in assembling the connector assembly is thus time-consuming overall and highly dependent on the skill of the relevant fitter.

This is something that needs to be improved.

SUMMARY OF THE INVENTION

With this in mind, the object of the present invention is to provide an electrical connector, preferably a field-installable connector, which can be reliably connected to an electrical cable with little effort, and which can preferably be suitable for use in high frequency applications.

Lastly, it is also an object of the invention to provide an electrical connector assembly formed of a cable and a connector, preferably a field-installable connector, which can be reliably assembled with little effort, and which can preferably be suitable for use in high-frequency technology.

It is further the object of the invention to provide an improved method for assembling an electrical connector assembly, particularly for manual field installation with reduced labor effort.

The object is achieved for the electrical connector with the features listed in claim 1. Regarding the electrical connector assembly, the object is achieved by the features of claim 12. Concerning the method for assembling the connector assembly, the object is achieved by claim 14.

The dependent claims and the features described below relate to advantageous embodiments and variants of the invention.

An electrical connector for an electrical cable is provided, having a contact element for connection to an electrical conductor of the electrical cable.

Preferably, the electrical connector is a connector for high-frequency technology. Preferably, the electrical connector is a coaxial connector which has an outer conductor contact element and an inner conductor contact element.

The electrical cable is preferably a coaxial cable with an outer conductor and an inner conductor coaxially guided in the outer conductor.

In principle, however, the invention can be suitable for use with any connector and any cable, for example also for use with non-coaxial connectors or cables and in particular also for connectors/cables with multiple inner conductor contact elements/inner conductors as well as for use with unshielded electrical connectors/cables.

Preferably, the electrical connector is a field-installable connector that can be manually connected to the electrical cable by a fitter at the site of subsequent use (for example, at a construction site).

In accordance with the invention, the electrical connector has an integrated cleaning tool for the electrical conductor. The cleaning tool is arranged along a feed direction for the electrical cable on the cable side upstream of the contact element.

Preferably, the cleaning tool is permanently accommodated in the electrical connector, i.e. it is a fixed component of the electrical connector. The cleaning tool is therefore preferably still present in the connector even when the connector or connector assembly is fully assembled.

It is proposed to arrange the cleaning tool in the connector in such a way that when the cable is inserted into the connector within the scope of an assembly operation, the electrical conductor of the cable first comes into contact with the cleaning tool for cleaning before the electrical conductor can be connected to the contact element of the connector.

Preferably, the cleaning tool is not part of the contact element of the connector, but is instead formed independently of the contact element of the connector. Preferably, the cleaning tool is axially spaced from the contact element along the longitudinal axis of the connector. In this way, the cleaning tool can fulfill its cleaning function and also a supplementary supporting function particularly well.

In accordance with the invention, the cleaning tool is designed to remove or at least retain particles, residues of a sheathing and/or contaminants adhering to the electrical conductor before the electrical conductor contacts the contact element of the electrical connector arranged downstream in the feed direction or is connected to the contact element of the connector within the scope of the connector assembly process.

It is an advantage of the invention that the cleaning of the electrical conductor of the cable from particles, residues of the sheathing and/or other contaminants takes place automatically during the insertion of the cable into the connector. A preceding, separate processing step for cleaning the electrical conductor can thus be omitted. The installation or assembly of the connector assembly on site is thus simplified. The assembly time is shortened and the convenience for the fitter is significantly increased. Last but not least, assembly is thus also less susceptible to errors and can be carried out more reliably.

The electrical properties of the fully assembled connector can also be optimized compared to assembly with manual cleaning, since the electrical contact between the electrical conductor and the contact element of the connector can be improved by the guaranteed reliable cleaning.

In particular, the cleaning tool can advantageously be designed to scrape off the contaminants on the electrical conductor, but preferably without scratching or otherwise damaging the electrical conductor. Preferably, the material of the cleaning tool is softer than the material of the electrical conductor, but possibly harder than the material of the expected contaminants/sheathing residues.

In addition, the cleaning tool can also provide a supporting or guiding function for the electrical conductor in the connector. The fact that the electrical conductor can be guided by the cleaning tool means that the electrical conductor can also be reliably electrically insulated from other conductive components, for example other electrical conductors or contact elements, if necessary.

According to a preferred further development of the invention, the cleaning tool can be sleeve-shaped and can have a through-hole for passing the electrical conductor through, preferably for passing the electrical conductor through with an accurate fit.

The inner diameter of the through-hole can correspond or at least substantially correspond to an outer diameter of the electrical conductor. The inner diameter of the through-hole preferably deviates from the outer diameter of the electrical conductor by a maximum of +/−5%, particularly preferably by a maximum of +/−4%, very particularly preferably by a maximum of +/−3%, further preferably by a maximum of +/−2%, even further preferably by a maximum of +/−1%, for example by a maximum of +/−0.5%.

According to a further development, it can be provided in particular that the inner diameter of the through-hole of the cleaning tool is smaller than the outer diameter of the electrical conductor, preferably a maximum of 5% smaller, particularly preferably a maximum of 4% smaller, very particularly preferably a maximum of 3% smaller, further preferably a maximum of 2% smaller, still further preferably a maximum of 1% smaller, for example a maximum of 0.5% smaller.

However, it can also be provided that the inner diameter of the through-hole of the cleaning tool is larger than the outer diameter of the electrical conductor, preferably a maximum of 5% larger, particularly preferably a maximum of 4% larger, very particularly preferably a maximum of 3% larger, further preferably a maximum of 2% larger, still further preferably a maximum of 1% larger, for example a maximum of 0.5% larger.

For example, the inner diameter of the through-hole can deviate from the outer diameter of the electrical conductor by up to +/−0.5 mm, but preferably only up to +/−0.1 mm, particularly preferably only up to +/−0.05 mm, for example only up to +/−0.01 mm.

The outer diameter of the electrical conductor can be, for example, 1.0 mm to 10 mm, preferably 1.9 mm to 4.9 mm.

By passing the electrical conductor through the through-hole of the cleaning tool, particles, residues of a sheathing and/or contaminants adhering to the electrical conductor are ultimately removed or at least retained before the electrical conductor contacts or is connected to the contact element of the electrical connector downstream in the feed direction within the scope of the connector assembly process.

Thus, an outer lateral surface of the electrical conductor (for example of an inner conductor or an outer conductor) can be cleaned of sheathing residues or other contaminants. In particular, sheathing residues can be scraped off the electrical conductor.

However, according to one embodiment of the invention described below, it can also be provided to clean an inner lateral surface of a sleeve-shaped electrical conductor of the electrical cable (for example an inner lateral surface of an outer conductor). According to this embodiment, the cleaning tool can be cylindrical in shape and can have a cylinder sheath for insertion into the electrical conductor, preferably for accurately fitting insertion into the electrical conductor.

The cylindrical cleaning tool can have an outer diameter that corresponds or at least substantially corresponds to an inner diameter of the electrical conductor. The outer diameter of the cylindrical cleaning tool preferably deviates from the inner diameter of the electrical conductor by a maximum of +/−5%, particularly preferably by a maximum of +/−4%, very particularly preferably by a maximum of +/−3%, further preferably by a maximum of +/−2%, still further preferably by a maximum of +/−1%, for example by a maximum of +/−0.5%.

In particular, it can be provided that the outer diameter of the cylindrical cleaning tool is larger than the inner diameter of the electrical conductor, preferably a maximum of 5% larger, particularly preferably a maximum of 4% larger, very particularly preferably a maximum of 3% larger, still more preferably a maximum of 2% larger, for example a maximum of 0.5% larger. However, it can also be provided that the outer diameter of the cylindrical cleaning tool is smaller than the inner diameter of the electrical conductor, preferably a maximum of 5% smaller, particularly preferably a maximum of 4% smaller, very particularly preferably a maximum of 3% smaller, still further preferably a maximum of 2% smaller, still further preferably a maximum of 1% smaller, for example a maximum of 0.5% smaller.

By inserting the cylinder sheath into the electrical conductor, the particles, residues of a sheathing and/or contaminants adhering to the electrical conductor can be removed or at least retained before the electrical conductor contacts or is connected to the contact element of the electrical connector downstream in the feed direction within the scope of the connector assembly process.

The electrical connector can have a cable-receiving chamber for the electrical cable. For example, components for sealing, such as ring seals, and/or components for securing the cable in the connector, such as crimp sleeves, threaded connections, or the like, can be provided in the cable-receiving chamber. Means for strain relief can also be provided. The electrical cable, for example the cable sheath of the cable and/or the outer conductor of the cable, is preferably mechanically secured in the cable-receiving chamber of the connector.

In an advantageous further development of the invention, it can be provided that the cleaning tool is arranged along the feed direction between the contact element and the cable-receiving chamber of the connector.

The cable-receiving chamber can be formed within a housing component of the connector, for example a housing shell or a housing sleeve. The housing component can be electrically conductive (for example made of a metal) or electrically non-conductive (for example made of a plastic). A combination of conductive and non-conductive materials can also be provided.

The cleaning tool can be attached to the inside of the housing component of the electrical connector. The cleaning tool can, for example, be pressed inside the housing component of the electrical connector and/or can rest against a radial shoulder. The cleaning tool can also be formed in one part with the housing component of the connector.

According to a further development of the invention, it can be provided that the cleaning tool is formed from an electrically non-conductive material. Preferably, the cleaning tool is made of a plastic.

The cleaning tool can be formed in one part or in multiple parts. In a multi-part design, for example, one or more components of the cleaning tool can also be formed from an electrically non-conductive material and one or more components can be formed from an electrically conductive material. In particular, it can be advantageous to make the region of the cleaning tool that comes into direct contact with the electrical conductor electrically non-conductive. In this way, on the one hand, a short circuit with a further conductor can be avoided and, on the other hand, a particularly gentle cleaning can be carried out, since a plastic material in particular is generally not capable of damaging the metal of the electrical conductor.

According to a further development of the invention, it can be provided that the cleaning tool has, on its end face on the cable side, an elevation tapering in the direction of the cable.

The tapered elevation is preferably directly adjacent to the through-hole or extends axially in extension of the through-hole. The through-hole can extend through the tapered elevation.

Due to the tapered elevation, the contaminations or residues of the sheathing can be safely and cleanly discharged laterally from the electrical conductor of the cable.

The tapered elevation preferably has a conical shape.

In a further development of the invention, it can be provided that the cleaning tool has a cleaning element through which the through-hole extends.

The cleaning element can be, for example, a sealing lip (for example made of rubber) or a shaped blade adapted to the circumference of the electrical conductor (for example a shaped blade made of a plastic).

The cleaning tool can optionally have sharp-edged edges or cleaning elements to enable scraping off of the contaminations or sheathing residues on the electrical conductor. However, flexible or elastic cleaning elements can also be advantageous as appropriate.

In a further development of the invention, it can be provided that the cleaning tool has a catch funnel portion facing the electrical cable and/or a chamfer and/or a cone.

In this way, the insertion of the electrical conductor into the cleaning tool or the insertion of the cleaning tool into the electrical conductor can be facilitated.

In an advantageous further development of the invention, it can be provided in particular that the cleaning tool is rotationally symmetrical.

Preferably, the cleaning tool is arranged coaxially to a longitudinal axis of the electrical connector and/or the electrical cable.

In principle, the cleaning tool can have any geometry and thus can be suitable in particular not only for treating a circular electrical conductor or a coaxial cable. For example, the through-hole or the cylinder sheath can also be rectangular in shape, for example also square, in order to treat, for example, a rectangular electrical conductor, such as a busbar. An elliptical, star-shaped or other geometry of the through-hole or cylinder sheath can also be provided.

In a further development of the invention, it can be provided that the inner diameter of the through-hole or the outer diameter of the cylinder sheath are dimensioned such that a fluid-tight connection is created between the cleaning tool and the electrical conductor when the electrical conductor is passed through or inserted into the electrical conductor.

For example, a gas-tight and/or liquid-tight connection can be provided between the cleaning tool and the electrical conductor. In essence, however, it is important that the dirt, particles and/or residues of the sheathing adhering to the electrical conductor are adequately kept out. A fluid-tight connection is thus not absolutely necessary, but is particularly advantageous for thorough cleaning of the electrical conductor of, for example, minute particles.

It can also be provided that the cleaning tool is designed for impedance matching in the transition region between the electrical cable and the electrical connector. A suitable geometry (in particular an axial and/or radial extension, symmetry/asymmetry) and/or material selection for the cleaning tool can advantageously be determined within the scope of simulations or calculations. By using the cleaning tool in addition to the impedance matching, the flexibility for the internal and external design of the connector can be improved.

In a particularly advantageous embodiment of the invention, it can additionally be provided that the electrical connector comprises a crimp sleeve and a stop element. The stop element can be arranged axially adjacently to the crimp sleeve in the feed direction of the electrical cable. The crimp sleeve can have a threaded inner lateral surface which is designed to be screwed to a threaded outer lateral surface of an outer conductor of the electrical cable. The crimp sleeve and the stop element can be arranged and formed within the electrical connector in such a way that an axial end of the outer conductor can be clamped between an axial end region of the crimp sleeve adjacent to the stop element and an axial end region of the stop element adjacent to the crimp sleeve.

The stop element can preferably be made of a metal material, and the crimp sleeve can be made of a metal or a non-metal material.

The cable can be connected to the connector on site using a suitable mechanical, hydraulic, pneumatic or electrical tool which presses the cable to the connector on both the inner and outer conductor sides. For this purpose, for example, an axial end of a rigid inner conductor of the cable can be pressed into a socket-shaped inner conductor contact element of the connector and an axial end of an outer conductor of the cable can be pressed between the stop element and the crimp sleeve of the connector. A connector of this type is also known as a compression connector because the cable and connector are pressed together. Alternatively, it is also possible to screw the cable and the connector together or to use some other fastening technique.

The inner conductor contact is preferably a radial contact, while the outer conductor contact is preferably a contact with an axial and a radial component.

The cable, of which the outer conductor preferably has a threaded outer lateral surface, can be screwed into the crimp sleeve of the connector, which for this purpose can have a corresponding threaded inner lateral surface.

The stop element and the crimp sleeve are each a preferably sleeve-shaped body. Thus, the axial end region of the crimp sleeve and the axial end region of the stop element are also each preferably a sleeve-shaped body. A longitudinal axis of the stop element, of the crimp sleeve and of the axial end region of the stop element or of the crimp sleeve thus runs along the center of rotation of the particular element or of the particular end region. A normal vector of a plane or any other surface shall be understood here and in the following to be a vector having an orientation perpendicular to the extension of the plane or the surface.

According to a first advantageous embodiment, in an assembled state of the connector and the cable, it can be provided that a longitudinal axis of the crimp sleeve is tilted by a tilt angle relative to a longitudinal axis of the stop element at least in the axial end region of the stop element.

According to a second advantageous embodiment, it can be provided that a normal vector of a plane spanned by an edge between an end face and an inner lateral surface of the stop element is rotated relative to the longitudinal axis of the crimp sleeve by an alignment angle.

According to a third advantageous embodiment, it can be provided that the edge has a helical course in a longitudinal axial direction of the connector.

The knowledge/idea forming the basis of the above embodiments consists in shaping the stop surface of the stop element, against which the axial end of the outer conductor of the cable is pressed with the crimp sleeve in the assembled state of the connector and the cable, in such a way that the foremost turn, opposite the stop element, of the internal thread formed in the crimp sleeve runs as parallel as possible to the stop surface of the stop element over as large an angular segment as possible of the sleeve-shaped circumference. As a result, optimum clamping of the outer conductor of the cable in the outer conductor contact element of the connector and thus the formation of optimum contact pressure between the outer conductor and the outer conductor contact element can be realized advantageously over a larger angular segment, preferably over at least half a turn of the thread and at best over the entire turn of the thread. This significantly minimizes the occurrence of passive intermodulations and impedance disturbances in the transition between the cable and the connector.

The invention also relates to an electrical connector assembly, having an electrical connector according to the foregoing and following embodiments and the electrical cable, the electrical conductor of which is connected to the contact element of the electrical connector.

At this juncture, it should be mentioned by way of precaution that the electrical connector can have any number of contact elements and the electrical cable can have any number of electrical conductors. Correspondingly, multiple cleaning tools can optionally also be provided for cleaning multiple electrical conductors before connecting them to the particular contact element in accordance with the invention. A common cleaning tool for cleaning multiple electrical conductors can also be provided.

In an advantageous embodiment of the invention, it can be provided that the electrical cable is a coaxial cable. Preferably, the electrical cable is a corrugated sheath cable. In principle, however, the cable can be any cable. For example, the invention can also be suitable for treating a high-voltage cable that has an electrical conductor formed as a busbar or that itself is formed as a bus bar.

In an advantageous further development of the invention, it can be provided that the electrical conductor of the electrical cable is an inner conductor, wherein the contact element of the electrical connector is an inner conductor contact element. The inner conductor contact element can have a socket-shaped end portion for connection to the inner conductor of the electrical cable (for example, a spring cage with one or more spring lugs), but can also be formed, for example, as a single spring lug, contact pin or end contact.

It can also be provided that the electrical conductor of the electrical cable is an outer conductor, wherein the contact element of the electrical connector is an outer conductor contact element. The outer conductor contact element can have a socket-shaped end portion for connection to the outer conductor of the electrical cable (for example a spring cage with one or more spring lugs), but can also be designed, for example, as a single spring lug, contact pin or end contact.

The invention also relates to an electrical connection, having an electrical connector assembly according to the foregoing and following embodiments and a corresponding electrical mating connector.

Advantageously, an electrical connection can be provided with a field-installable connector that has an inherent support and scraping function for cleaning electrical conductors of an electrical cable due to the integrated cleaning tool. The cleaning of the electrical conductor is thus integrated into the connector and is performed automatically when the connector is crimped, screwed or otherwise attached to the cable.

The invention also relates to a method for assembling an electrical connector assembly, having at least the following method steps:

a) providing an electrical connector;
b) providing an electrical cable having a cable end preassembled for connection to the electrical connector, wherein at least one electrical conductor of the electrical cable is exposed at the cable end;
c) feeding the cable end into the electrical connector along a feed direction in order to connect the electrical conductor to a contact element of the electrical connector, wherein the electrical conductor, before it contacts the contact element of the electrical connector, is treated by a cleaning tool integrated into the electrical connector in order to remove or at least retain particles adhering to the electrical conductor, residues of a sheathing and/or contaminants.

Since the electrical connector has an integrated cleaning tool, the cleaning step of the electrical conductor can be performed time-synchronously with the assembly step or the insertion of the electrical conductor into the electrical cable. An additional cleaning tool and an additional cleaning step are therefore not required.

Preferably, the method is one that can be performed manually by a fitter at the intended location of use of the connector assembly.

In principle, the method can have any further method steps, for example method step for pre-assembly of the electrical cable, for partial or pre-assembly of the electrical connector, for crimping and/or screwing the cable end into the connector, etc.

Preferably, the treatment of the electrical conductor is carried out by passing the electrical conductor through a through-hole of the cleaning tool (preferably with an accurate fit) or by inserting a cylinder sheath of the cleaning tool into the electrical conductor (preferably with an accurate fit) in order to remove or at least retain the particles, residues of a sheathing and/or contaminants adhering to the electrical conductor.

In an advantageous further development of the method, it can be provided in particular that the electrical conductor of the cable is manually freed from a sheathing before the cable end is fed into the electrical connector.

When an electrical cable is exposed or stripped, residues of the outer sheathing or dielectric are sometimes left behind, particularly on the inner cable conductor, since the #s of the stripping tool are usually deliberately positioned at a defined distance around the inner conductor in order to prevent damage to the conductor. The size of this distance is determined by the diameter tolerances of the electrical conductor and the coaxiality tolerances of the electrical cable. Accordingly, for a reliable connection to a contact element of the electrical connector, it is sometimes necessary to clean the electrical conductor afterwards to scrape off the residues of the sheathing. This assembly step is particularly time-consuming for field-installed connectors or for connectors that are to be assembled on site. With the connector according to the invention and the proposed cleaning by the cleaning tool simultaneously during the insertion of the electrical cable into the connector, the assembly can be facilitated considerably.

The invention is particularly suitable for use in high-frequency technology, for example for the installation of mobile radio components on transmission towers.

Features described in conjunction with one of the subjects of the invention, namely given by the electrical connector, the electrical connector assembly, the electrical connection and the method, can also be advantageously implemented for the other subjects of the invention. Likewise, advantages mentioned in conjunction with one of the subjects of the invention can also be understood to apply to the other subjects of the invention.

It should also be noted that terms such as "comprising", "having" or "with" do not exclude other features or steps. Furthermore, terms such as "a" or "the" that indicate a singular number of steps or features do not exclude a plurality of features or steps—and vice versa.

In a purist embodiment of the invention, however, it can also be provided that the features introduced in the invention by the terms "comprising", "having" or "with" are listed exhaustively. Accordingly, one or more listings of features can be considered complete within the scope of the invention, for example considered in each case for each claim. For example, the invention may consist solely of the features stated in claim 1.

It should be noted that designations such as "first" or "second," etc. are used primarily for the purpose of distinguishing respective device or process features and are not necessarily intended to imply that features are mutually dependent or interrelated.

Furthermore, it should be emphasized that the values and parameters described herein include deviations or fluctuations of ±10% or less, preferably ±5% or less, further preferably ±1% or less, and most preferably ±0.1% or less of the corresponding designated value or parameter, provided that these deviations are not excluded in the implementation of the invention in practice. The specification of ranges by initial and final values also includes all those values and fractions which are included by the particular designated range, in particular the initial and final values and a corresponding mean value.

The invention also relates to an electrical connector independent of claim 1, having an integrated cleaning tool for an electrical conductor of an electrical cable. The further features of claim 1 and the dependent claims, as well as the features described in the present description, relate to advantageous embodiments and variants of this electrical connector.

BRIEF DESCRIPTION OF THE DRAWINGS

Exemplary embodiments of the invention are described in more detail below with reference to the drawings.

The figures each show preferred exemplary embodiments in which individual features of the present invention are shown in combination with one another. Features of one exemplary embodiment can also be implemented separately from the other features of the same exemplary embodiment and can accordingly be readily combined by a person skilled in the art to form further useful combinations and sub-combinations with features of other exemplary embodiments.

In the figures, functionally identical elements are provided with the same reference signs.

The figures show schematically:

Figure 1:
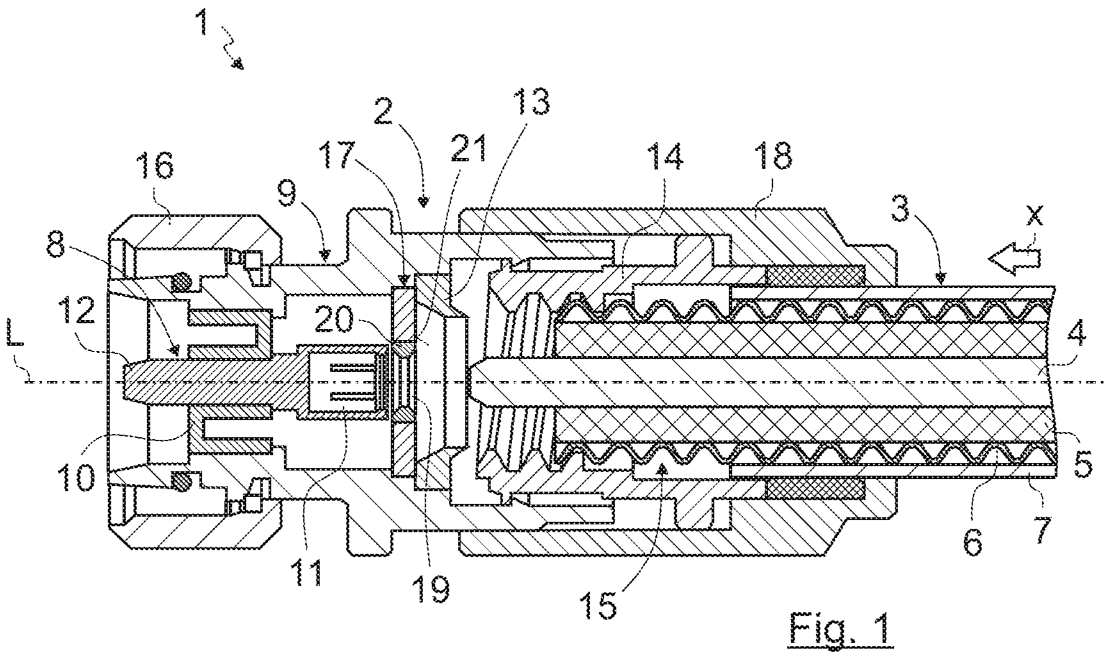
Figure 2:
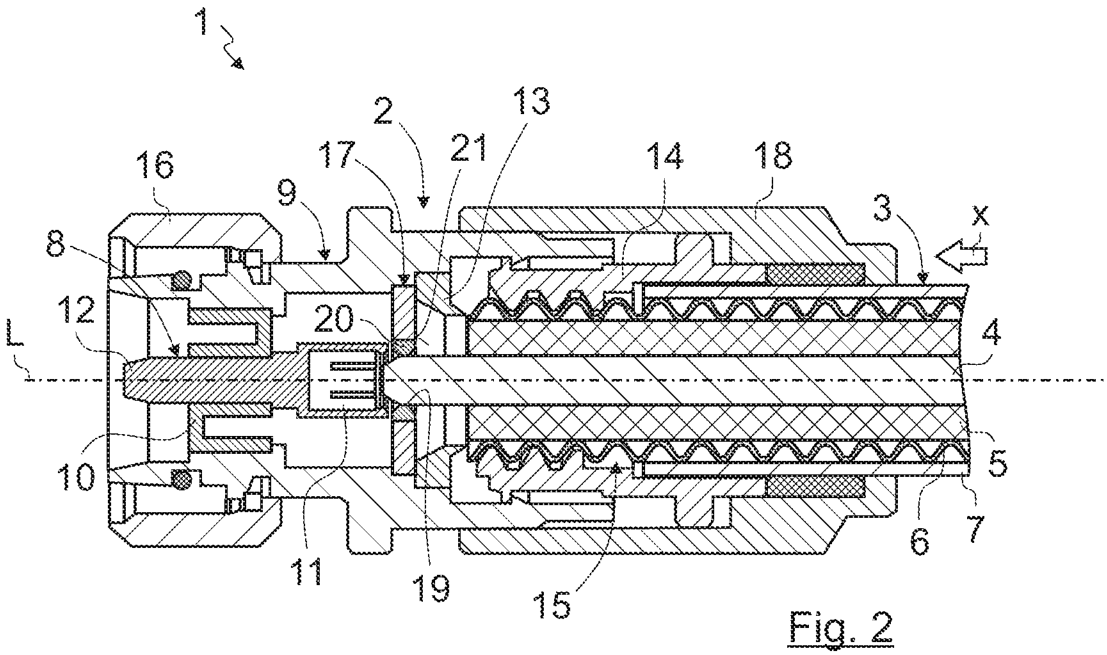
Figure 3:
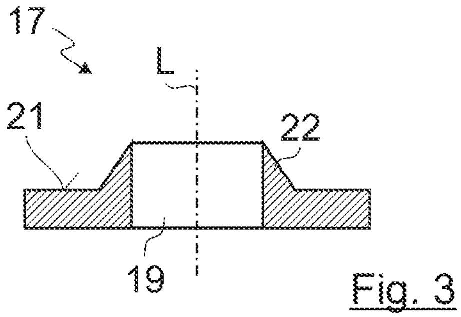
Figure 4:
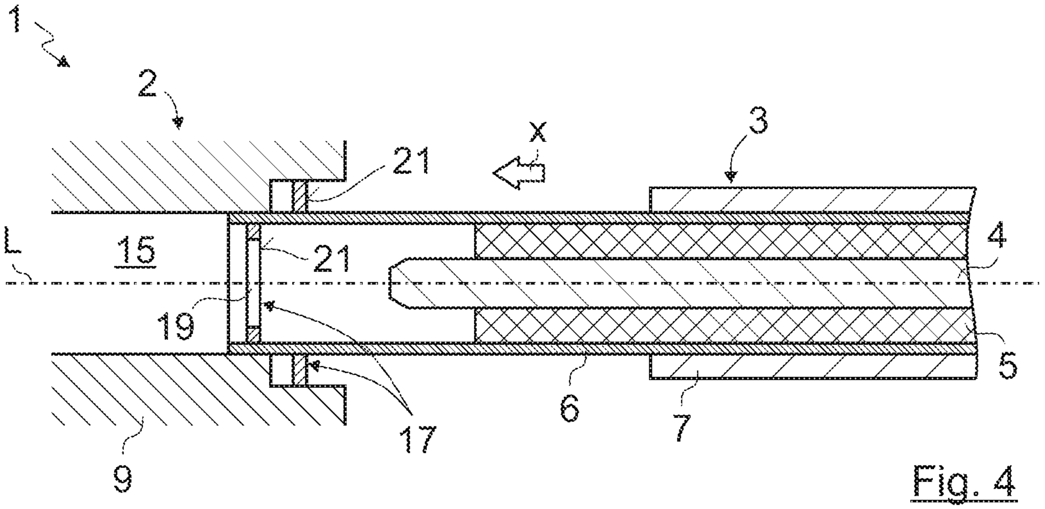
Figure 5:
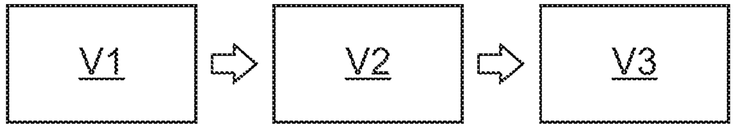

FIG. 1 a cross-sectional view of an electrical connector assembly according to the invention with a pre-assembled electrical cable partially inserted into the electrical connector;

FIG. 2 the electrical connector assembly of FIG. 1, wherein the electrical cable has been inserted further still into the connector within the scope of an assembly process;

FIG. 3 an individual view of a further cleaning tool of an electrical connector according to the invention;

FIG. 4 a cross-sectional view of a further electrical connector assembly according to the invention; and FIG. 5 a method sequence of a method according to the invention for assembling the electrical connector assembly.

DETAILED DESCRIPTION OF THE ENABLING EMBODIMENTS

FIGS. 1 and 2 show an electrical connector assembly 1 in two assembly states. In the assembled state, the electrical connector assembly 1 has an electrical connector 2 and an electrical cable 3 connected to the electrical connector 2. By way of example, the electrical connector assembly 1, the electrical connector 2 and the electrical cable 3 are each designed coaxially for transmitting a high-frequency signal.

The electrical cable 3 has an inner conductor 4, a dielectric 5 concentrically enclosing the inner conductor 4, an outer conductor 6 concentrically enclosing the dielectric 5, and a cable sheath 7 concentrically enclosing the outer conductor 6. The outer conductor 6 is formed as a corrugated metal tube. Such an electrical cable 3 is also referred to as a "corrugated sheath cable". The region between the corrugated metal tube of the outer conductor 6 and the dielectric 5 is preferably filled with air to allow easy bending of the electrical cable 3. The inner conductor 4 can also optionally be formed as a corrugated metal tube.

The electrical connector 2 has an inner conductor contact element 8, an outer conductor contact element 9 and an insulator element 10, which is arranged between the inner conductor contact element 8 and the outer conductor contact element 9. The insulator element 10 distances the inner conductor contact element 8 coaxially from the outer conductor contact element 9 and electrically insulates both contact elements 8, 9 from each other.

On the cable side, the inner conductor contact element 8 has a socket-shaped end portion 11 formed as a spring contact sleeve for receiving and for frictionally engaged connection to the inner conductor 4 of the cable 3. On the plug side, on the other hand, the inner conductor contact element 8 has a pin-shaped end 12 for contacting or connecting to a socket-shaped mating contact element of a mating electrical connector. The mating connector is not shown in the exemplary embodiments. Alternatively, however, the plug-side end of the inner conductor contact element 8 can also be of a socket-shaped design.

The outer conductor contact element 9 is sleeve-shaped, for example. An annular metal stop element 13 is arranged on a shoulder formed on the inner lateral surface of the outer conductor contact element 9 in the direction of the cable 3. The stop element 13 is preferably connected to the outer conductor contact element 9 by means of a press fit. However, other fastening techniques are also possible in principle, such as a screw connection or a solder connection. Alternatively, the stop element 13 can also be connected in one part to the outer conductor contact element 9. Axially adjacently to the stop element 13, arranged upstream along a feed direction x for the electrical cable 3, a crimp sleeve 14 is provided. The inner lateral surface of the crimp sleeve 14 is thread-shaped, which corresponds to a thread-shaped outer lateral surface of the outer conductor 6 of the cable 3 and consequently has the same thread pitch and the same tooth flank shape and size.

Within the scope of a method for assembling the electrical connector assembly 1, the cable 3 is screwed into the crimp sleeve 14 with the outer conductor 6 exposed from the cable sheath 7. The electrical connector 2 has a suitable cable-receiving chamber 15 for the electrical cable 3. At the end of the screwing process, a longitudinal portion of the axial end of the outer conductor 6 is unscrewed from the foremost turn of the threaded inner lateral surface of the crimp sleeve 14, which can subsequently be used for reliable clamping between the stop element 13 and the crimp sleeve 14 (FIG. 2 shows a state shortly before clamping).

The mechanical fastening of the connection formed of the electrical connector 2 and the electrical mating connector, which is not shown in more detail, can be carried out in a known manner, for example via a union nut 16, which is movably fastened to the connector 2. The internal thread formed on the inner lateral surface of the union nut 16 can be screwed to a corresponding external thread formed on the outer lateral surface of the outer conductor contact element 9 of the mating connector.

Within the scope of the preassembly, i.e. the preparation of the electrical cable 3 for connection to the electrical connector 2, the electrical conductors 4, 6 of the cable 3, i.e. in particular the inner conductor 4 and the outer conductor 6, are preferably manually stripped of a sheathing, i.e. for example the dielectric 5 and/or the cable sheath 7, before the cable end of the cable 3 is fed into the electrical connector 2. In so doing, it may be that residues of the sheathing remain on the electrical conductor 4, 6, for example the inner conductor 4. Furthermore, other particles or contaminants may also adhere to the electrical conductor 4, 6, which may impair an electrical connection to the corresponding contact element 8, 9 of the connector 2. For this reason, it is known to clean the electrical conductor 4, 6 accordingly or to scrape off remaining sheathing residues and contaminations before assembly. This process is comparatively complex and basically undesirable for a field-installable connector 2.

In accordance with the invention, an integrated cleaning tool 17 for the electrical conductor 4, 6 is provided within the electrical connector 2 and is arranged along the feed direction x for the electrical cable 3 on the cable side upstream of the contact element 8, 9. The cleaning tool 17 is thus arranged between the cable-receiving chamber 15 of the connector 2 and the contact element 8, 9 of the connector 2 and is attached to the inside of a housing component of the electrical connector 2. The housing component can be, for example, a housing shell or a housing sleeve 18. In the exemplary embodiment, the housing component in which the cleaning tool is attached is the outer conductor contact element 9 of the connector 2.

By means of the cleaning tool 17, particles adhering to the electrical conductor 4, 6, residues of a sheathing and/or contaminants can be removed or at least retained before the electrical conductor 4, 6 contacts the contact element 8, 9 of the electrical connector 2 arranged downstream in the feed direction x within the scope of the connector assembly process. In the exemplary embodiment, the principle of the invention is first illustrated in FIGS. 1 and 2 for cleaning the inner conductor 4 of the electrical cable 3. However, this is not to be understood restrictively. In principle, any inner lateral surface or outer lateral surface of any electrical conductor 4, 6 of the cable 3 can be treated by means of a proposed cleaning tool 17 integrated in the connector 2.

FIGS. 1 and 2 show a first, preferred further development of the invention, according to which the cleaning tool 17 is sleeve-shaped and has a through-hole 19 for passing the electrical conductor 4, 6 through with an accurate fit, the through-hole 19 having an inner diameter which corresponds to an outer diameter of the electrical conductor 4, 6 or which is (slightly) smaller than the outer diameter of the electrical conductor 4, 6. The inner diameter of the through-hole 19 can be dimensioned here, for example, in such a way that when the electrical conductor 4, 6 or the inner conductor 4 is passed through between the cleaning tool 17 and the inner conductor 4, a fluid-tight connection is formed, for example a gas-tight and/or liquid-tight connection. In FIG. 1, the inner conductor 4 of the cable 3 is still spaced from the cleaning tool 17; in FIG. 2, the electrical cable 3 has already been inserted sufficiently deeply into the connector 2 so that the inner conductor 4 of the cable 3 has been partially passed through the cleaning tool 17. The front axial end portion of the inner conductor 4 protruding from the cleaning tool 17 on the plug side is thus sufficiently cleaned and prepared for connection to the inner conductor contact element 8.

Preferably, the cleaning tool 17 is made of an electrically non-conductive material, in particular a plastic. In principle, however, it can also be sufficient if only the region of the cleaning tool 17 that is in direct contact with the electrical conductor 4, 6 is made of a non-conductive material. In principle, however, the cleaning tool 17 can also be formed from a conductive material. The cleaning tool 17 can also be formed in one part with the electrical connector 2, for example the housing component 9, 18 of the electrical connector 2, for example the outer conductor contact element 9 of the electrical connector 2.

Optionally, the cleaning tool 17 can have a cleaning element 20, through which the through-hole 19 extends, for example a sealing lip or a shaped blade adapted to the outer circumference of the electrical conductor 4, 6.

In the exemplary embodiments, the cleaning tool 17 is rotationally symmetrical and arranged coaxially to the longitudinal axis L of the electrical connector 2.

Optionally, the cleaning tool 17 can have a catch funnel feature, for example a catch funnel portion, a chamfer, or the like, to facilitate insertion of the electrical conductor 4, 6.

FIG. 3 shows a cleaning tool 17 according to a further exemplary embodiment in an individual representation. In order to facilitate the removal of any sheathing that may have remained on the electrical conductor 4, 6, the cleaning tool 17 can optionally have, on its cable-side end face 21, an elevation 22 tapering in the direction of the cable 3, said elevation preferably being directly adjacent to the through-hole 19.

As already mentioned, the cleaning tool 17 can also be advantageously suitable for treating the outer conductor 6 of the electrical cable 3, or for an electrical conductor 4, 6 which is of sleeve-shaped design. In order to illustrate the principle schematically, a second variant of the invention is shown in FIG. 4, in which the cleaning tool 17 is of cylindrical design and has a cylinder sheath for insertion with an accurate fit into the outer conductor 6, wherein the outer diameter of the cylindrical cleaning tool 17 corresponds to the inner diameter of the outer conductor 6 or is larger than the inner diameter of the outer conductor 6. For attaching the cleaning tool 17 within the connector 2, for example, webs or other holding devices (not shown) can be provided, wherein the outer conductor 6 of the cable 3, in the exemplary embodiment of FIG. 4 a smooth tube, can optionally have axial slots or other recesses (not shown) so as not to collide with the webs/holding devices of the cleaning tool 17.

It is also possible in principle to treat the outer surface or the outer sheath of the outer conductor 6 of the electrical cable 3 by means of a further cleaning tool 17, as also indicated in FIG. 4.

FIG. 5 shows the sequence of an exemplary method according to the invention for assembling the electrical connector assembly 1 with three exemplary method steps.

According to a first method step V1, the electrical connector 2 can first be provided. Optionally, further assembly steps for pre-assembly and/or partial assembly of the connector 2 can also be provided.

In a second method step V2, it can be provided to provide the electrical cable 3, wherein the electrical cable 3 can already be pre-assembled for use with the connector 2. Thus, at the cable end of the cable 3, at least one electrical conductor 4, 6 of the electrical cable 3 can be exposed. However, it can also be envisaged that, in the context of the proposed method, the pre-assembly is carried out only on site, in particular manually by a fitter.

In a third method step V3, the cable end of the cable 3 can be fed to the electrical connector 2, preferably inserted into the electrical connector 2, in order to connect the electrical conductor 4, 6 to the contact element 8, 9 of the electrical connector 2. However, before the electrical conductor 4, 6 contacts the contact element 8, 9 of the electrical connector 2, it can optionally be provided that the electrical conductor 4, 6 is fed in an accurately fitting manner through a through-hole 19 of a sleeve-shaped cleaning tool 17 integrated in the electrical connector 2, or that a cylinder sheath of a cylindrical cleaning tool 17 integrated in the electrical connector 2 is inserted into the electrical conductor 4, 6 in an accurately fitting manner. In this way, simultaneously with the feeding of the cable end of the cable 3, particles adhering to the electrical conductor 4, 6, residues of a sheathing and/or contaminants can be removed or at least retained. In an advantageous manner, the assembly of the connector assembly can thus be facilitated.

What is claimed is:

1. An electrical connector for an electrical cable having a contact element for connection to an electrical conductor of the electrical cable, the electrical connector comprising:

an integrated cleaning tool for the electrical conductor, the integrated cleaning tool being arranged along a feed direction for the electrical cable on the cable side upstream of the contact element;

the integrated cleaning tool being designed to remove or at least retain particles, residues of a sheathing and/or contaminations adhering to the electrical conductor before the electrical conductor contacts the contact element of the electrical connector arranged downstream in the feed direction within the scope of a connector assembly process;

wherein the cleaning tool is sleeve-shaped and has a through-hole for passing the electrical conductor through with an accurate fit; and wherein the cleaning tool having a cleaning element comprised of a sealing lip or a shaped blade defining the through-hole.

2. The electrical connector according to claim 1, wherein the cleaning tool is arranged along the feed direction between the contact element and a cable-receiving chamber of the connector, and is attached to the inside of a housing component of the electrical connector.

3. The electrical connector according to claim 1, wherein the cleaning tool has, on its cable-side end face, an elevation tapering in the direction of the cable and disposed directly adjacently to the through-hole.

4. The electrical connector according to claim 1, wherein the cleaning tool has a catch funnel portion facing the electrical cable to facilitate insertion of the electrical conductor.

5. The electrical connector according to claim 1, wherein the cleaning tool is rotationally symmetrical, with the through-hole arranged coaxially to a longitudinal axis of the electrical connector.

6. The electrical connector according to claim 1, wherein the inner diameter of the through-hole is dimensioned in such a way that a fluid-tight connection is created between the cleaning tool and the electrical conductor when the electrical conductor is passed through.

7. The electrical connector according to claim 1, wherein the inner diameter of the through-hole of the cleaning tool corresponds or at least substantially corresponds to the outer diameter of the electrical conductor, deviating by a maximum +/−5%.

8. The electrical connector according to claim 7, wherein the inner diameter of the through-hole of the cleaning tool is smaller than the outer diameter of the electrical conductor.

9. The electrical connector according to claim 1, wherein the cleaning tool is formed from an electrically non-conductive material.

10. The electrical connector according to claim 9, wherein the cleaning tool is comprised of plastic.

11. An electrical connector assembly having an electrical connector according to claim 1 and the electrical cable, wherein the electrical conductor of the electrical cable is connected to the contact element of the electrical connector.

12. The electrical connector assembly according to claim 11, wherein the electrical conductor of the electrical cable is an inner conductor, the contact element of the electrical connector being an inner conductor contact element with a socket-shaped end portion for connection to the inner conductor of the electrical cable.

13. A method for assembling an electrical connector assembly comprised of the following method steps:

providing an electrical connector;

providing an electrical cable having a preassembled cable end for connection to the electrical connector, wherein at least one electrical conductor of the electrical cable is exposed at the cable end; and feeding the cable end into the electrical connector along a feed direction in order to connect the electrical conductor to a contact element of the electrical connector, wherein the electrical conductor, before it contacts the contact element of the electrical connector, is treated by a cleaning tool integrated in the electrical connector, the cleaning tool having a cleaning element comprised of a sealing lip or a shaped blade defining a through-hole in order to remove or at least retain particles, residues of a sheathing and/or contaminants adhering to the electrical conductor as the electrical conductor is passed through the through-hole with an accurate fit;

wherein the electrical conductor of the cable is manually freed from a sheathing before feeding the cable end into the electrical connector.

* * * * *